(12) United States Patent
Hansen et al.

(10) Patent No.: US 11,328,591 B1
(45) Date of Patent: May 10, 2022

(54) DRIVER ASSISTANCE SYSTEM FOR DRIVERS USING BIOPTIC LENSES

(71) Applicant: FORD GLOBAL TECHNOLOGIES, LLC, Dearborn, MI (US)

(72) Inventors: Cheri L. Hansen, Canton, MI (US); Cynthia M. Neubecker, Westland, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/156,820

(22) Filed: Jan. 25, 2021

(51) Int. Cl.
*G08G 1/0962* (2006.01)
*G06F 3/01* (2006.01)

(52) U.S. Cl.
CPC ........... *G08G 1/0962* (2013.01); *G06F 3/013* (2013.01)

(58) Field of Classification Search
CPC .............................. G08G 1/0962; G06F 3/013
See application file for complete search history.

(56) References Cited

U.S. PATENT DOCUMENTS

| | | | |
|---|---|---|---|
| 9,230,180 B2 | 1/2016 | Zhang et al. | |
| 2010/0302503 A1 | 12/2010 | Oestereich et al. | |
| 2016/0297362 A1 | 10/2016 | Tijerina et al. | |
| 2018/0354523 A1* | 12/2018 | Kishi | G06V 20/597 |
| 2020/0065597 A1* | 2/2020 | Bade | G06V 20/58 |
| 2020/0074197 A1* | 3/2020 | Upmanue | G01C 21/3602 |
| 2020/0286292 A1* | 9/2020 | Kondo | G02B 27/0179 |
| 2020/0293815 A1* | 9/2020 | Pfeifle | G06V 20/58 |

FOREIGN PATENT DOCUMENTS

GN 101722907 A 6/2010

OTHER PUBLICATIONS

Xianping Fu, et al, Telescope Aiming Point Tracking Method for Bioptic Driving Surveillance, IEEE Transactions or Neural Systems and Rehabilitation Engineering, vol. 18, No. 6, Dec. 2010.
Gang Luo, et al, Methods for Automated Identification of Informative Behaviors in Natural Bioptic Driving, IEEE Transactions on Biomedical Engineering, vol. 59, No. 6, Jun. 2012.
Cynthia Owsley, et al, Visually Impaired Drivers Who Use Bioptic Telescopes: Self-Assessed Driving Skills and Agreement With On-Road Driving Evaluation, The Association for Research in Vision and Ophthalmology, Inc., 2014.

* cited by examiner

*Primary Examiner* — Hongmin Fan
(74) *Attorney, Agent, or Firm* — Frank L. Lollo; MacMillan, Sobanski & Todd, LLC

(57) ABSTRACT

Assistance is provided to a driver of a road vehicle using bioptic eyewear which has a carrier lens and a telescopic lens. Presence of bioptic eyewear on the driver is detected while driving the vehicle. Spatial positioning of the driver with bioptic eyewear is tracked to identify a telescopic event in which the driver is looking through the telescopic lens. A gaze direction through the telescopic lens is detected during the telescopic event. Remote sensing data is collected covering a region of interest corresponding to a projection of the gaze direction. An object is detected within the region of interest. A driving indicator is identified according to the object. The driving indicator is presented to the driver as supplemental information to highlight key driving indicators such as identity of signage and color of a traffic light.

20 Claims, 4 Drawing Sheets

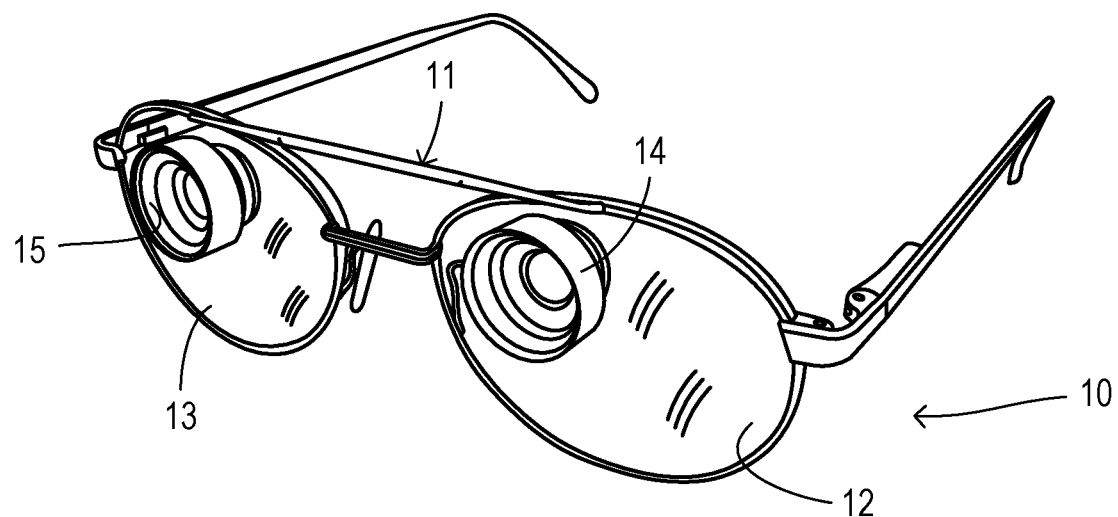
Fig. 1
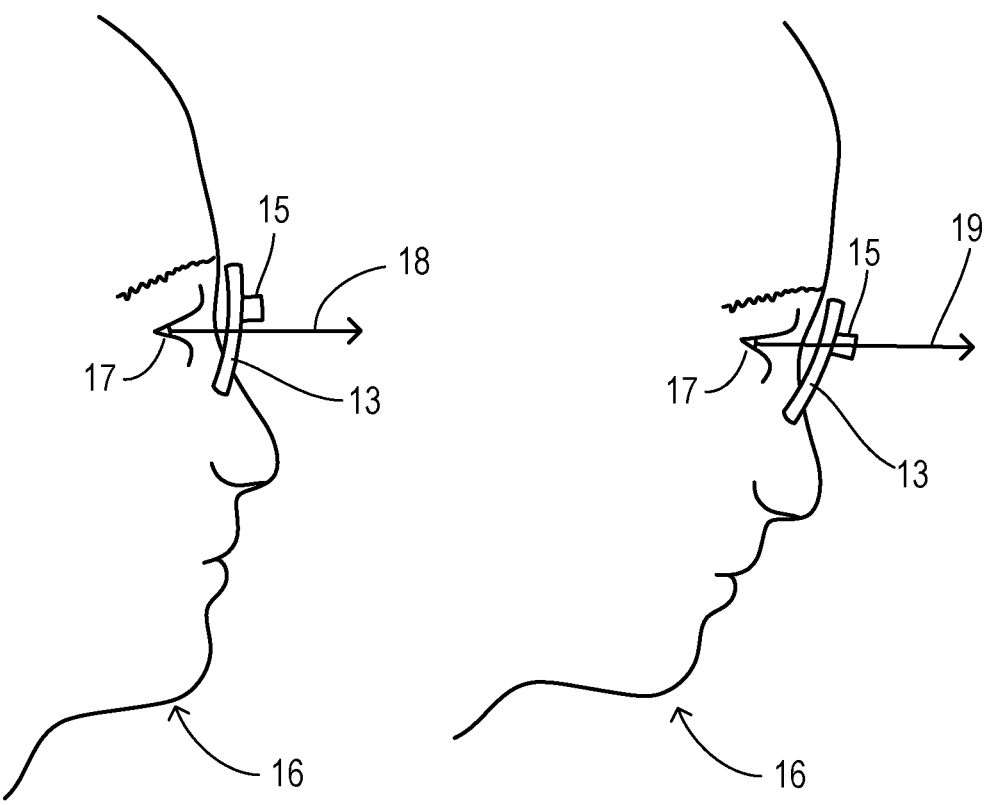
Fig. 2
Fig. 3

DRIVER ASSISTANCE SYSTEM FOR DRIVERS USING BIOPTIC LENSES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to a driver assistance system, and, more specifically, to providing enhanced driver information according to a region of interest being inspected by a driver through a telescopic portion of bioptic vision equipment.

Low vision drivers may use bioptic eyewear to assist them during driving. These specialized bioptic glasses have a normal carrier lens and a telescopic lens mounted on or adjacent the carrier lens above the eye. The driver mainly looks through the carrier lens (e.g., 95% of the time) to monitor a wide field of view. To spot objects and/or other aspects of the environment in the distance, the driver briefly looks through the telescopic lens. The bioptic eyewear may typically include a glasses frame holding left and right carrier lenses. There may be a telescopic element on one or both carriers, and the telescopic portion may be binocular or monocular.

To use the telescope portion, the driver tilts their head forward to bring down the telescopic lens while raising their gaze until a line of sight through the telescopic lens is aligned with an object of interest. Drivers are trained to become proficient at quickly spotting an object in order to reduce the amount of time that their attention is focused on the one object. Most telescopic lenses have a fixed focal length which can make spotting difficult, especially at high speeds. It would be desirable to providing additional assistance to drivers to obtain the desired information they are seeking more quickly and with greater confidence.

SUMMARY OF THE INVENTION

In one aspect of the invention, a method is provided for assisting a driver of a road vehicle. Presence of bioptic eyewear on the driver is detected while driving the vehicle. The bioptic eyewear has a carrier lens and a telescopic lens. Spatial positioning of the driver with bioptic eyewear is tracked to identify a telescopic event in which the driver is looking through the telescopic lens. A gaze direction through the telescopic lens is detected during the telescopic event. Remote sensing data is collected covering a region of interest corresponding to a projection of the gaze direction. An object is detected within the region of interest. A driving indicator is identified according to the object. The driving indicator is presented to the driver.

BRIEF DESCRIPTION OF THE DRAWINGS

FIG. 1 is a perspective view of bioptic eyewear.

FIG. 2 is a diagram showing positioning of a user while gazing through a carrier lens of bioptic eyewear.

FIG. 3 is a diagram showing positioning of a user while gazing through a telescopic lens of bioptic eyewear.

DETAILED DESCRIPTION OF PREFERRED EMBODIMENTS

Figure 4:
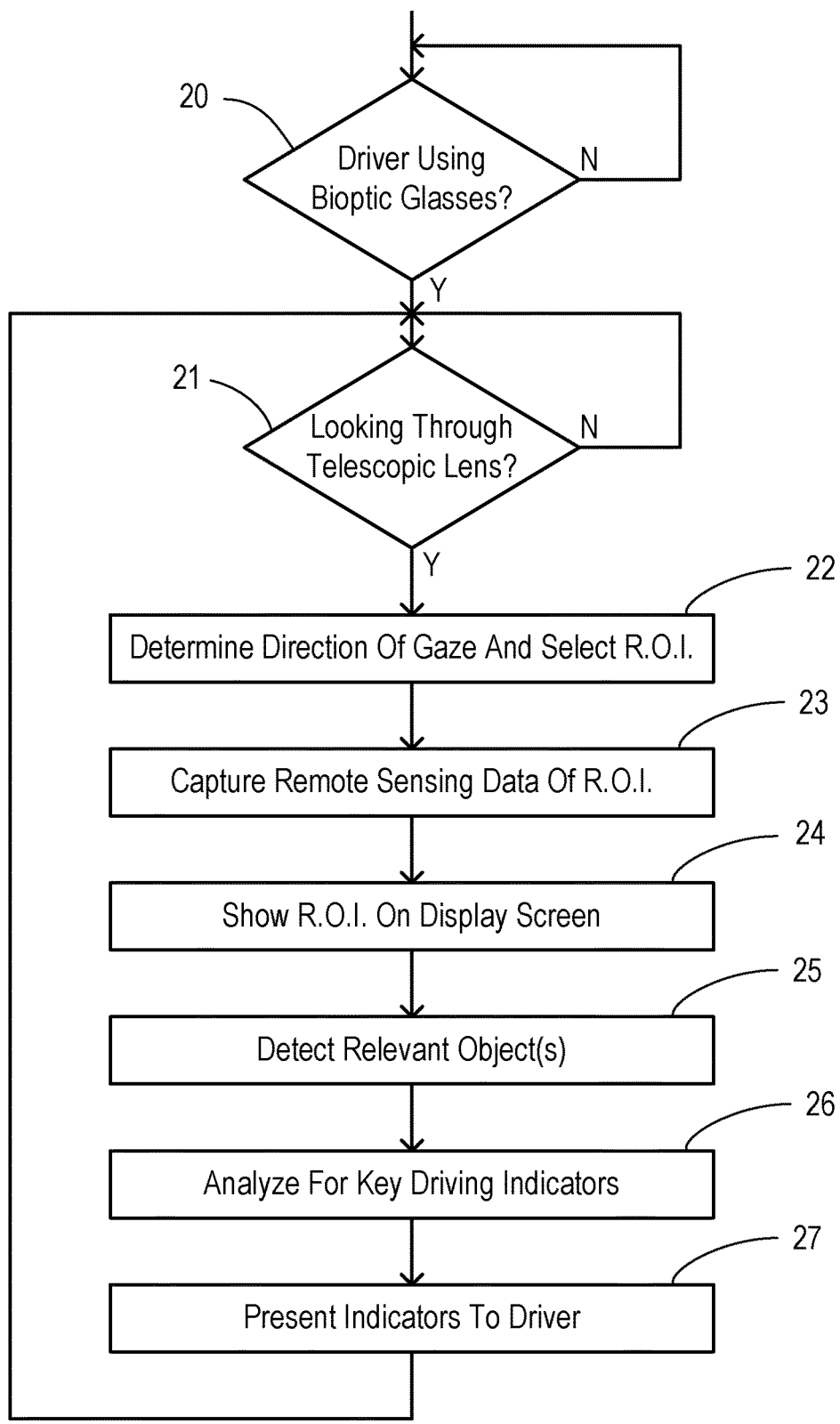
FIG. 4 is a flowchart showing one preferred method of the invention.

The invention increases situational awareness for a user of a bioptic device by detecting events when the telescopic lens is being used based on in-vehicle monitoring by a driver-state monitoring camera. Upon detection of the usage of the telescopic lens, the gaze of the eye(s) looking through the telescopic lens(es) is analyzed to determine the direction of the gaze. The gaze direction points to a region of interest in the distance outside the vehicle. Remote sensors in the vehicle (e.g., a forward looking camera) identify the surrounding scene. Particular objects and/or key driving indicators (e.g., traffic directives such as color of traffic lights or traffic signage) are automatically identified using known methods such as pattern recognition and image analysis. An HMI interface (audio and/or visual) provide situational awareness by communicating the driving indicators to the driver. To improve the robustness of detecting telescopic lens use and gaze direction which are based on monitoring the positions of the driver's head and their bioptic device, a customization or configuration process can be utilized to calibrate a monitoring system according to each user.

Biopic glasses have a unique appearance compared to other glasses. Machine learning algorithms can be easily trained to detect a driver wearing such a device. Furthermore, a vehicle controller can be provided with stored personal profiles (or other driver personal information) to aid in the detection of a driver using bioptic eyewear. Once a bioptic lens user is detected, the assistance feature can be automatically enabled. Alternatively, the assistance feature could be manually enabled.

When the feature is active, an interior camera monitors the driver to detect the motion indicative of telescope usage. This motion includes a combination of head tilted down and eye gaze tilted up. Once this motion is detected, known eye gaze algorithms can pinpoint a region of interest that the driver is trying to see. Determination of the eye-gaze direction can include use of zoom and/or region-of-interest configuration settings that may be stored in advance based on the optical properties (e.g., magnification factor) of the driver's bioptic device. The gaze direction and/or region of interest can be mapped onto remotely sensed data from other vehicle sensors (e.g., exterior camera(s) or radar sensors). Object detection methods can then be employed in the region to identify key driving indicators, such as the color of traffic light, textual or graphic information on a sign, description of a vehicle, and the like. An audio read-back feature can be initiated to audibly inform the driver of the situational information and/or a zoomed view of the scene can be displayed on a display screen (e.g., vehicle mounted display panel or on a mobile device).

Referring to FIG. 1, a bioptic eyewear device 10 has a frame supporting carrier lenses 12 and 13. Carrier lenses 12 and 13 may typically be corrective lenses. Telescopic lenses 14 and 15 are affixed at upper edges of carrier lenses 12 and 13, respectively.

FIGS. 2 and 3 depict how a user 16 repositions in order to selectably obtain a view through the respective lenses. In FIG. 2, user 16 holds their head substantially vertical such that a gaze from their eye 17 through carrier lens 13 obtains a horizontal line of sight 18. For driving, user 16 mainly relies on line of sight 18 through carrier lens 13. When wanting to inspect a distant object or area more closely, user 16 tilts their hear forward and shifts their gaze from eye 17 upward as shown in FIG. 3. A line of sight 19 is obtained through telescopic lens 15 for a brief moment (referred to herein as a telescopic event).

FIG. 4 shows a method of the invention wherein a step 20 performs a check to determine whether the driver is using a bioptic device. For example, an image captured by a driver monitoring camera can be inspected to detect the shape of bioptic hardware superimposed upon the face of the driver. Alternatively, a configuration setting in the vehicle may identify a user of bioptic eyewear through association with a particular ignition key or key fob. When a driver having bioptic eyewear is present, then the driver is substantially continuously monitored in step 21 to determine whether they are looking through the telescopic lens. For example, successive images captured by the interior camera are analyzed to track movement of reference points on the driver's head and/or eyewear. Whenever a tracked spatial positioning of the driver identifies a telescopic event in which they are looking through the telescopic lens, then the method proceeds to step 22 to determine a gaze direction through the telescopic lens. Projection of the gaze direction from the driver's eyes identifies a region of interest outside the vehicle where the gaze is being directed. Gaze direction may likewise be determined using the same driver monitoring camera by analyzing points in the image including different parts of the eyes and/or reference points on the eyewear.

In step 23, remote sensing data is captured corresponding to the region of interest using one or more exterior remote sensors. The remote sensors may include passive sensors (e.g., visible-light or infrared cameras) or active sensors (e.g., radar trackers). Such remote sensors may typically be already available on the vehicle in connection with other driver assistance systems. In step 24, remotely sensed data corresponding to the region of interest may optionally be shown on an interior display screen. For example, a zoomed-in visual image from an exterior camera can be displayed. The optional optionally displayed image can be cropped to display the region of interest and may be presented before any further processing for extracting important details. The displayed image may persist on the display screen after the telescopic event ends so that the driver has sufficient opportunity to see it.

In step 25, the remote sensing data collected for the region of interest is analyzed in order to detect relevant objects that may pertain to the driving situation. Based on identities of the detected objects, an analysis is performed in step 26 to determine key driving indicators corresponding to the detected objects. For example, detected objects may include traffic control devices for providing traffic directives to drivers, such as traffic signal lights using color (green, yellow, red) to control traffic flow through an intersection or traffic signage for indicating turning lanes, street names, and the like. The key driving indicators inform the driver of the specific directive that is to be followed. In step 27, the key indicators are presented to the driver within a short period of time of having looked at the region of interest so that the information can be recognized as being correlated with the telescopic event.

Figure 5:
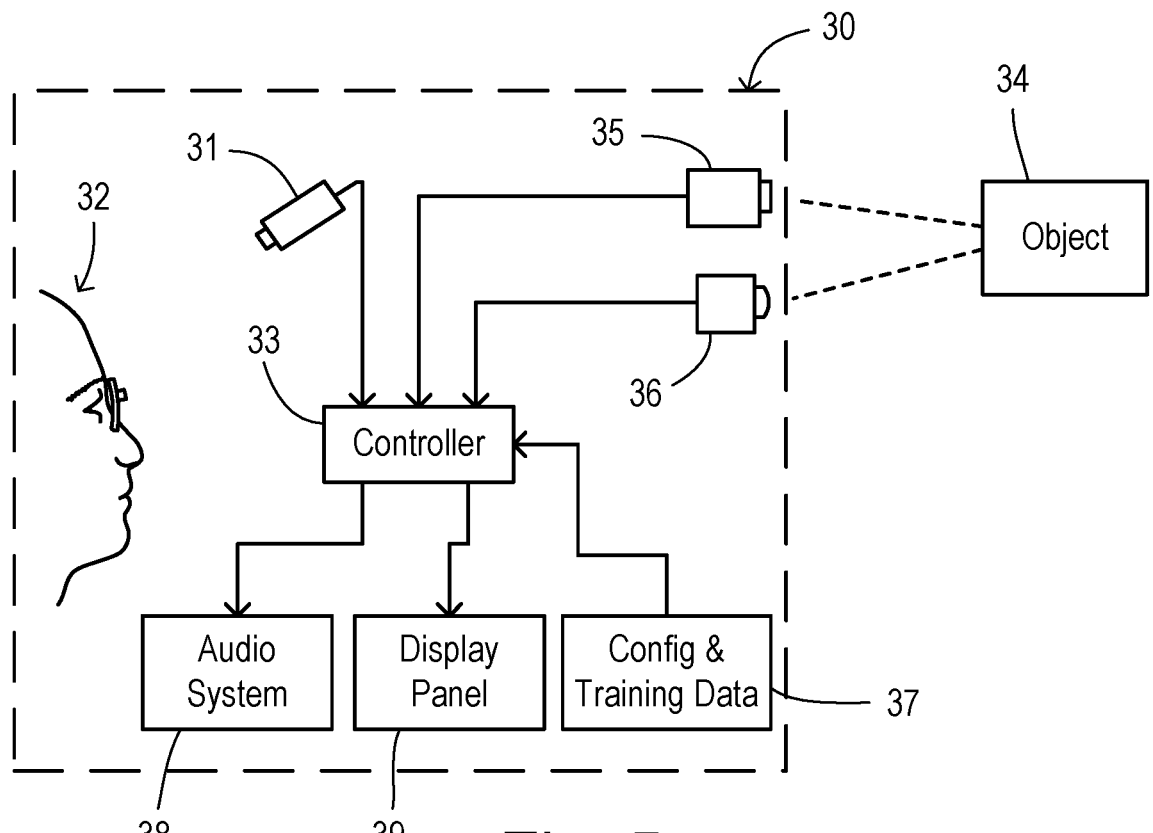
FIG. 5 is a block diagram showing one preferred embodiment of a driver assistance system of the invention.

FIG. 5 shows a driver assistance system wherein a vehicle 30 includes a driver monitoring camera 31 for viewing a driver 32 using bioptic eyewear. Captured images of driver 32 are provided from camera 31 to a controller 33 so that telescopic events wherein driver 32 is viewing an external object 34 through a telescopic lens can be identified. Camera 31 and controller 33 may be part of a driver status monitor (DSM) system. Alternatively, controller 33 can be a stand-alone component, can be integrated within another vehicle module such as a body control module (BCM), or can be implemented by multiple processors in different modules communicating over a vehicle data bus. Vehicle 30 includes exterior sensors such as an exterior camera 35 and/or a radar 36 for remotely sensing object 34. Remote sensing data from camera 35 or radar 36 is provided to controller 33 to be used for recognizing object 34 and for extracting useful driving indicators. Controller 33 is connected to a configuration and training data memory 37. Configuration and training data stored in memory 37 may be based, at least in part, on characteristic data defining the user's distinctive motions and/or properties of the bioptic eyewear, for example. Controller 33 is also coupled to a human-machine interface which includes an audio system 38 for presenting audible output messages to driver 32 and a display panel 39 for depicting graphic and/or textual driving indicators.

Figure 6:
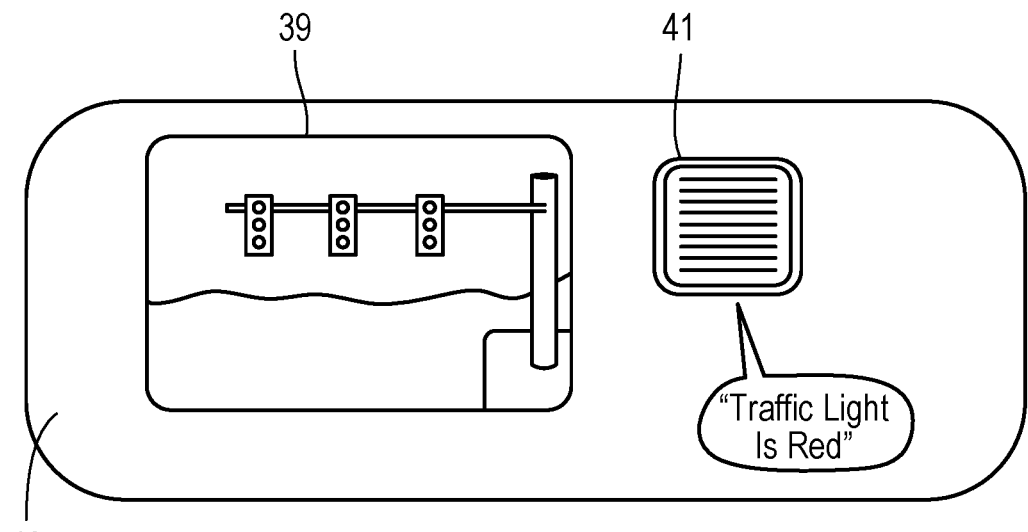
FIG. 6 is a diagram showing a human-machine interface presenting driver assistance information to the driver.

FIG. 6 shows an example of driving indicators that are presented to the driver. Display panel 39 which is mounted in and instrument panel 40 of the vehicle passenger cabin shows a zoomed-in image of the region of interest associated with a telescopic event. For example, the region of interest defined by the driver's gaze includes a set of traffic lights. A key driving indicator that may be extracted from the image of the region of interest may include the active color being illuminated by the traffic lights. A loudspeaker 41 which is also mounted in the passenger cabin may reproduce an audible message such as a statement that the color of the traffic light is red.

In some embodiments, calibratable settings and/or data sets can improve the capability of detecting telescopic events and accurately determining a gaze direction. Settings for a particular user can include a zoom level (e.g., magnification) and other specifications relating to the bioptic eyewear as well as customization settings for operation of the driver assistance such as the type of notifications to be given.

Calibration can also include a one-time setup process to create a data set that models a specific driver. During the process, a driver uses their bioptic eyewear to spot specifically placed objects at certain distances in a static situation while the driver status monitoring system learns the corresponding movements for these regions to better aid the spotting and detection capability for dynamic use during driving. For example, specifically designed training placards are placed at a variety of distances and heights relative to the driver while the vehicle is stationary. Camera measurement techniques can be used to obtain the coordinates of the placards, or Geotagging techniques can be used to embed location information in each placard. Thus, each placard is oriented relative to the driver at a specific viewing angle from the driver's seat. The driver is told to spot placards at respective times while the camera system tracks the spatial positioning/movements of the driver for shifting from a view through the carrier lens to a view through the telescopic lens and the subsequent spotting of the placard (object) at each location. Collected data which relates the driver spatial positions with the movements into a telescopic event and the gazing at respective placard locations is input to a machine learning system. Machine learning algorithms process the data to generate a trained data set for the user that models the relationship of driver positioning to the use of the telescopic lens to gaze in particular directions. The training enables the driver assistance system to better understand the movements of the head and eye relative to different heights and distances.

Figure 7:
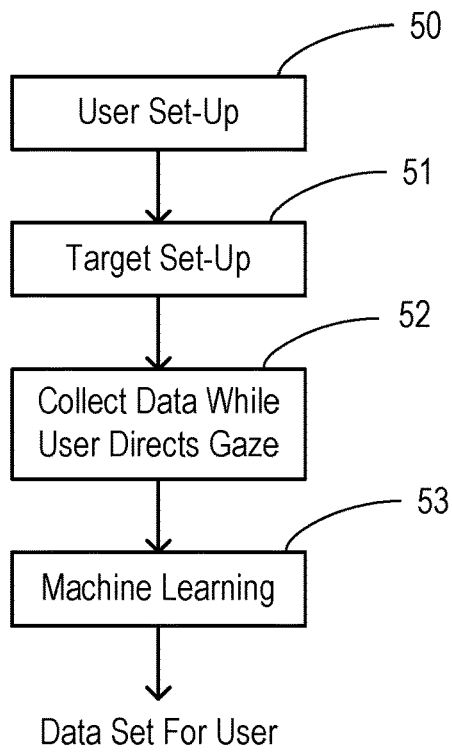
FIG. 7 is a flowchart showing a configuration method of the invention.

A set-up method is summarized in FIG. 7. In step 50, a user set-up is performed in which the user wearing their bioptic eyewear is seated in the driver's seat and a driver status monitor system is activated to capture successive images of the driver for tracking the spatial position of the driver and the bioptic eyewear. In step 51, target placards are deployed around the parked vehicle at a range of heights, distances, and viewing angles. Then the driver is requested to look at specified targets during a plurality of viewing trials. The driver's movements to place their gaze upon the specified targets (i.e., putting each target into the field of view of the telescopic lens) are recorded and labeled according to the corresponding object (i.e., target) location. Data collected for all of the targets is input to a machine learning system in step 53, which generates a user's data set that is input to the driver assistance controller for use in analyzing the driver's spatial movements during driving to detect telescopic events and the characterize the direction of their gaze.

Figure 8:
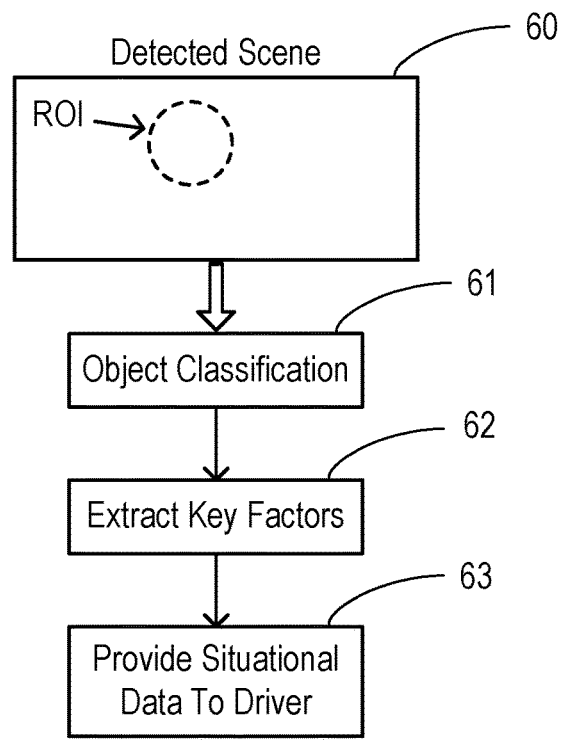
FIG. 8 is a flowchart showing a method of the invention.

FIG. 8 depicts a detected scene 60 which is comprised of remote sensing data covering a region of interest (ROI). Scene 60 may, for example, include camera data captured by one or more exterior cameras which are operating during the driving of the vehicle. The ROI is identified according to a gaze direction of the driver looking through the telescopic lens. The ROI may be defined according to a predetermined zone (e.g., a circular or rectangular region spanning a 15° field of view) which may or may not equate with the actual field of view of the telescopic lens. Image data corresponding to the ROI is input to an object classification system. In step 61, object classification is performed by identifying boundaries of objects present in the image data and then matching those boundaries according to predetermined driving-related classes of objects. The classes of objects may include traffic control elements such as signaling lights, signage, other vehicles, obstacles, pedestrians, or other kinds of objects which are expected to be encountered during driving. Each driving-related class may be associated with a corresponding key factor. For example, when a traffic light is detected then a predetermined key factor may be comprised of the color of the active illumination of the traffic light. When the class of object is a traffic control sign, the key factor may be comprised of a required turning direction. In step 62, a key factor associated with the driving-related class found for the object in step 61 is extracted (e.g., detected by analyzing the image data to determine that the color of illumination of a traffic light is red). In step 63, the extracted key factor is provided to the driver as situational data to assist in the driving of the vehicle. The situational data can be presented to the driver for a brief time after the telescopic event has ended, unless a new telescopic event is initiated and the process is repeated to determine a new gaze direction and object detection is repeated for a new region of interest.

What is claimed is:

1. A method of assisting a driver of a road vehicle, comprising steps of:
   detecting presence of bioptic eyewear on the driver while driving the road vehicle, wherein the bioptic eyewear has a carrier lens and a telescopic lens;
   tracking spatial positioning of the driver with bioptic eyewear to identify a telescopic event in which the driver is looking through the telescopic lens;
   detecting a gaze direction through the telescopic lens during the telescopic event;
   collecting remote sensing data covering a region of interest corresponding to a projection of the gaze direction;
   detecting an object within the region of interest;
   identifying a driving indicator according to the object; and
   presenting the driving indicator to the driver.

2. The method of claim 1 wherein the step of collecting remote sensing data is comprised of capturing a camera image including the region of interest using a vehicle-mounted image sensor.

3. The method of claim 2 further comprising a step of:
   presenting a visual display of the region of interest on a display panel in the road vehicle.

4. The method of claim 1 further comprising a step of:
   classifying the object by matching to predetermined driving-related classes;
   wherein the driving-related classes are each associated with a corresponding key factor; and
   wherein identifying the driving indicator is comprised of extracting the key factor associated with the driving-related class matching the object.

5. The method of claim 1 wherein the driving indicator is comprised of a traffic directive.

6. The method of claim 5 wherein the traffic directive is comprised of a color of an illuminated traffic light or identification of a traffic control sign.

7. The method of claim 1 wherein the driving indicator is presented to the driver using an audible message.

8. The method of claim 1 wherein the driving indicator is presented to the driver using a visual display including a graphic image or a textual display.

9. The method of claim 1 wherein the steps of tracking spatial positioning and detecting the gaze direction utilize configuration data specific to the driver and the bioptic eyewear and obtained from a training process.

10. The method of claim 9 wherein the training process is comprised of:
    deploying a plurality of targets at predetermined positions with respect to the road vehicle;
    monitoring driver movements while following a sequence of viewing trials directed to specified ones of the targets; and
    processing the driver movements and the sequence using machine learning to generate a trained data set.

11. A driver assistance system for a vehicle to assist a driver using bioptic eyewear, wherein the bioptic eyewear has a carrier lens and a telescopic lens, the system comprising:
    an interior image sensor capturing images of the driver;
    an exterior sensor sensing an exterior environment;
    a human-machine interface configured to convey information to the driver;
    a controller configured to 1) track spatial positioning in response to the images of the driver to identify a telescopic event in which the driver is looking through the telescopic lens, 2) detect a gaze direction through the telescopic lens during the telescopic event, 3) project the gaze direction to determine a region of interest in the exterior environment, 4) analyze remote sensing data from the exterior sensor covering the region of interest to detecting an object within the region of interest, 5) identify a driving indicator according to the object, and 6) presenting the driving indicator to the driver on the human-machine interface.

12. The driver assistance system of claim 11 wherein the exterior sensor is comprised of a camera capturing a camera image including the region of interest.

13. The driver assistance system of claim 12 wherein the controller is further configured to present a visual display of the region of interest on the human-machine interface.

14. The driver assistance system of claim 11 wherein the controller is further configured to classify the object by matching to predetermined driving-related classes, wherein the driving-related classes are each associated with a corresponding key factor, wherein the controller is configured to identify the driving indicator by extracting the key factor associated with one of the driving-related classes matching the object.

15. The driver assistance system of claim 11 wherein the driving indicator is comprised of a traffic directive.

16. The driver assistance system of claim 15 wherein the traffic directive is comprised of a color of an illuminated traffic light or identification of a traffic control sign.

17. The driver assistance system of claim 11 wherein the human-machine interface comprises an audio system, and wherein the driving indicator is presented to the driver using an audible message reproduced by the audio system.

18. The driver assistance system of claim 11 wherein the human-machine interface comprises a visual display, and wherein the driving indicator is presented to the driver on the visual display using a graphic image or a textual display.

19. The driver assistance system of claim 11 wherein the controller includes configuration data specific to the driver and the bioptic eyewear utilized to track spatial positioning and detect the gaze direction.

20. The driver assistance system of claim 19 wherein the controller is configured to perform a training process to generate the configuration data by 1) deploying a plurality of targets at predetermined positions with respect to the vehicle, 2) monitoring driver movements while following a sequence of viewing trials directed to specified ones of the targets, and 3) processing the driver movements and the sequence using machine learning.

* * * * *